June 20, 1967     E. B. DEMETROVITS     3,326,477

GRINDERS

Filed Feb. 3, 1964     3 Sheets-Sheet 1

INVENTOR.
EUGENE B. DEMETROVITS
BY
B. T. Wobensmith
ATTORNEY

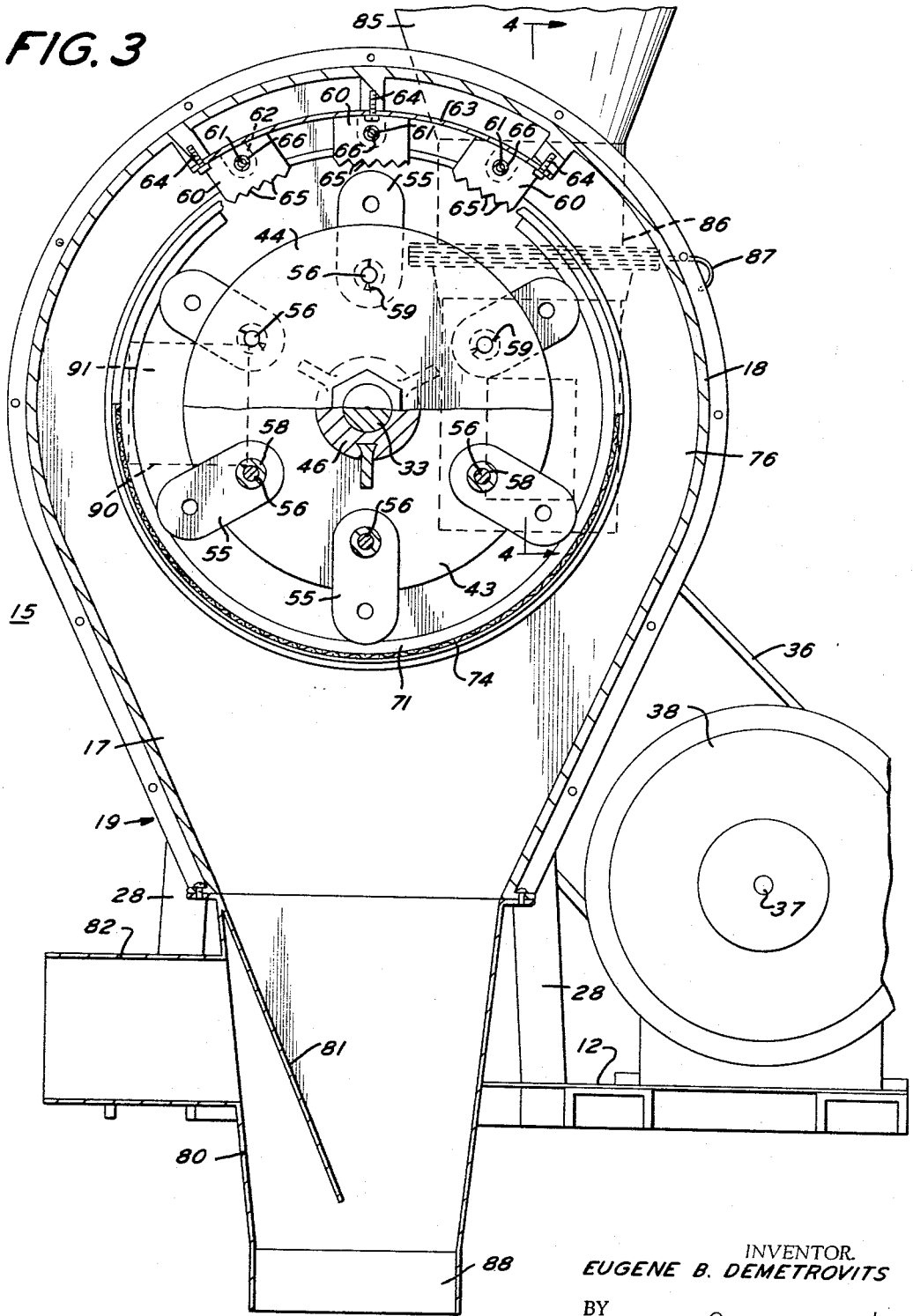

United States Patent Office 3,326,477
Patented June 20, 1967

3,326,477
GRINDERS
Eugene B. Demetrovits, 245 W. Chelten Ave.,
Philadelphia, Pa. 19144
Filed Feb. 3, 1964, Ser. No. 341,974
4 Claims. (Cl. 241—60)

This invention relates to grinders and more particularly to grinding apparatus for grain, feed, and the like.

Various grinders have heretofore been proposed but these had excessive power requirements, were not readily movable if required from place to place, were not readily adaptable to change in size of the resulting product, tended to heat or overheat the grain during grinding, or had other defects or shortcomings.

It is the principal object of the present invention to provide a grinder which is particularly suitable for grinding grain such as wheat, corn, barley, rice, and the like, with or without the admixture of other materials for bulk or for other purposes, which is relatively light in weight for its capacity and which can be readily driven from any suitable power source.

It is a further object of the present invention to provide a grinder which is particularly suitable for grinding grain for feed and the like in which the size of the product can be readily selected by the employment of a removable screen having the desired mesh or aperture size.

It is a further object of the present invention to provide a grinder which is particularly suitable for grinding grain and the like in which provision is made for the introduction of air for cooling so that adherence or attachment of the ground material to the equipment is avoided, and the product as delivered is improved in quality.

It is a further object of the present invention to provide a grinder which is particularly suitable for grinding grain for feed and in which the component parts are simple in construction and readily accessible for inspection, replacement or repair, the simplicity of the components making costly repairs unnecessary.

It is a further object of the present invention to provide a grinder having rotating grinder blades movable with respect to fixed blades in the housing and in which the rotation is utilized for cooling air circulation to maintain a high quality product.

Other objects and advantageous features of the invention will be apparent from the description and claims.

The nature and characteristic features of the invention will be more readily understood from the following description taken in connection with the accompanying drawings forming part thereof, in which:

FIG. 3 is a vertical sectional view taken approximately on the line 3—3 of FIG. 2;

Figure 1:
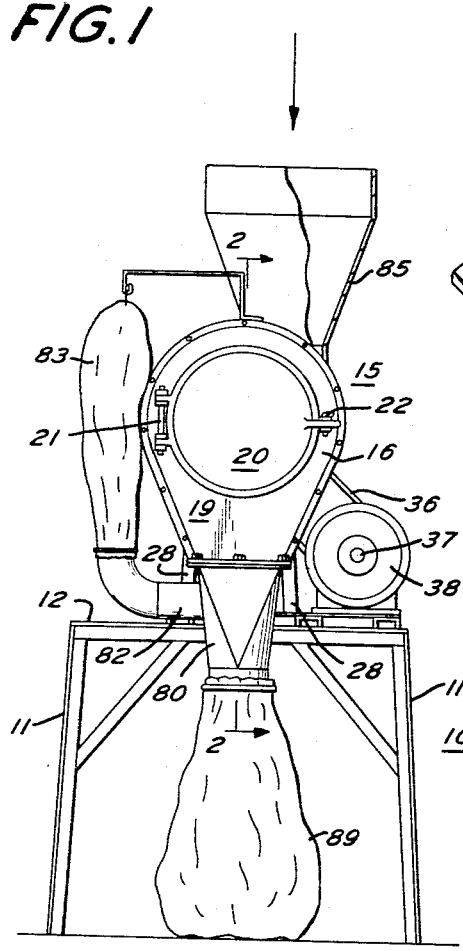
FIGURE 1 is a front elevational view of a grinder in accordance with the invention, part of the hopper being broken away to show the interior thereof.
Figure 4:
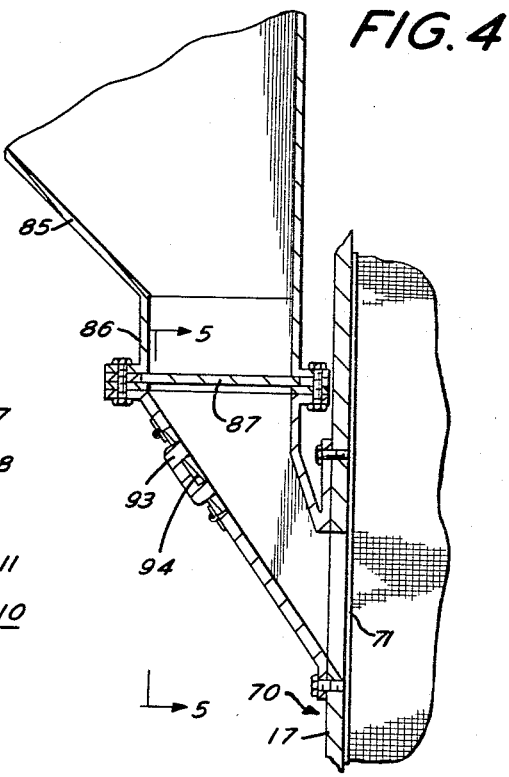
FIG. 4 is a vertical sectional view taken approximately on the line 4—4 of FIG. 3.
Figure 5:
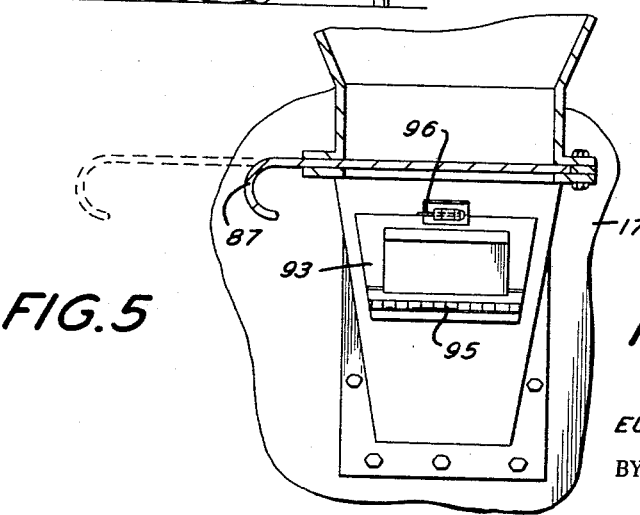
FIG. 5 is a vertical sectional view taken approximately on the line 5—5 of FIG. 4.

It should, of course, be understood that the description and drawings herein are illustrative merely, and that various changes and modifications may be made in the structure disclosed without departing from the spirit of the invention.

Referring now more particularly to the drawings, in which a preferred embodiment of the invention is illustrated, a supporting frame 10 is provided having uprights 11 and a table or platform 12, although any other desired type of support can be employed. The grinder includes a housing 15 of generally flat cylindrical shape with a front wall 16, a rear wall 17 connected to the front wall 16 by a cylindrical wall portion 18, and a converging bottom tubular section 19. The housing 15 is shown as made of two sections bolted together but can advantageously be made of integral construction. The front wall 16 is provided with a door 20 hingedly mounted on a hinge pin 21 and with a lock pin 22 for retaining the same in closed position. The door 20 is preferably seated on a flange 23 formed on the wall 16 and surrounding an inner annular rim 24, and a gasket 25 may be interposed for preventing leakage.

A rear housing extension 26 is provided having a horizontal platform 27 and downwardly diverging supports 28 engaging the table 12 to support the housing 15.

The platform 27 has spaced bearing blocks 29 and 30 with bearings 31 and 32 therein. The bearings 31 and 32 have a shaft 33 journaled therein. The shaft 33, at any preferred location therealong, such as between the bearings 31 and 32 or rearwardly of the bearing 31, has a driving pulley 34 secured thereto.

The pulley 34, as illustrated, is connected to a pulley 35 by belts 36, the pulley 35 being keyed to the shaft 37 of an electric motor 38 mounted on the platform 12. The shaft 33 can be driven in any desired manner, and dependent upon the power source available, such as by a belt from a tractor, a belt from a separate internal combustion engine or from any other available power source capable of rotating the shaft 33 at the desired speed.

The shaft 33 has an enlargement providing a shoulder 41 and a plurality of spaced blade carrying discs 42, 43 and 44 are provided and mounted on the shaft 33. The discs 42, 43 and 44 are held in spaced relation by spacers 45 and 46 and are held in assembled relation on the shaft 33 by a nut 47 bearing on a washer 48 and in threaded engagement with a threaded end portion 49 of the shaft 33.

The discs 42, 43 and 44, inwardly of their peripheries, have blades 55, of generally oval shape, swingably mounted on blade pivot rods 56 extending parallel to the shaft 33. The rods 56 have enlarged heads 57, and interposed spacers 58 are mounted thereon to position the blades 55 in predetermined spaced relation with respect to the discs 42, 43 and 44 and to each other. The rods 56 have removable cotter pins 59 to permit their removal and the removal and replacement of the blades 55.

The housing 15, preferably at the top thereof, has a plurality of blades 60, in groups, three groups being shown. The blades 60 in each group are carried on mounting rods 61 with spacers 66 interposed to position the blades 60 for the movement therebetween of the blades 55 during their movement. The rods 61 are carried in brackets 62 on supporting plates 63, the plate 63 being secured to the interior of the housing 15 by bolts 64.

While the blades 60 may be of any preferred type, it has been found advantageous to provide serrations 65 along the edges thereof facing the shaft 33 for increasing the grinding action.

Figure 6:
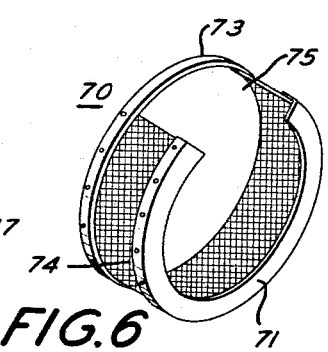
FIG. 6 is a view in perspective of one of the screens employed in the grinder.
Figure 2:
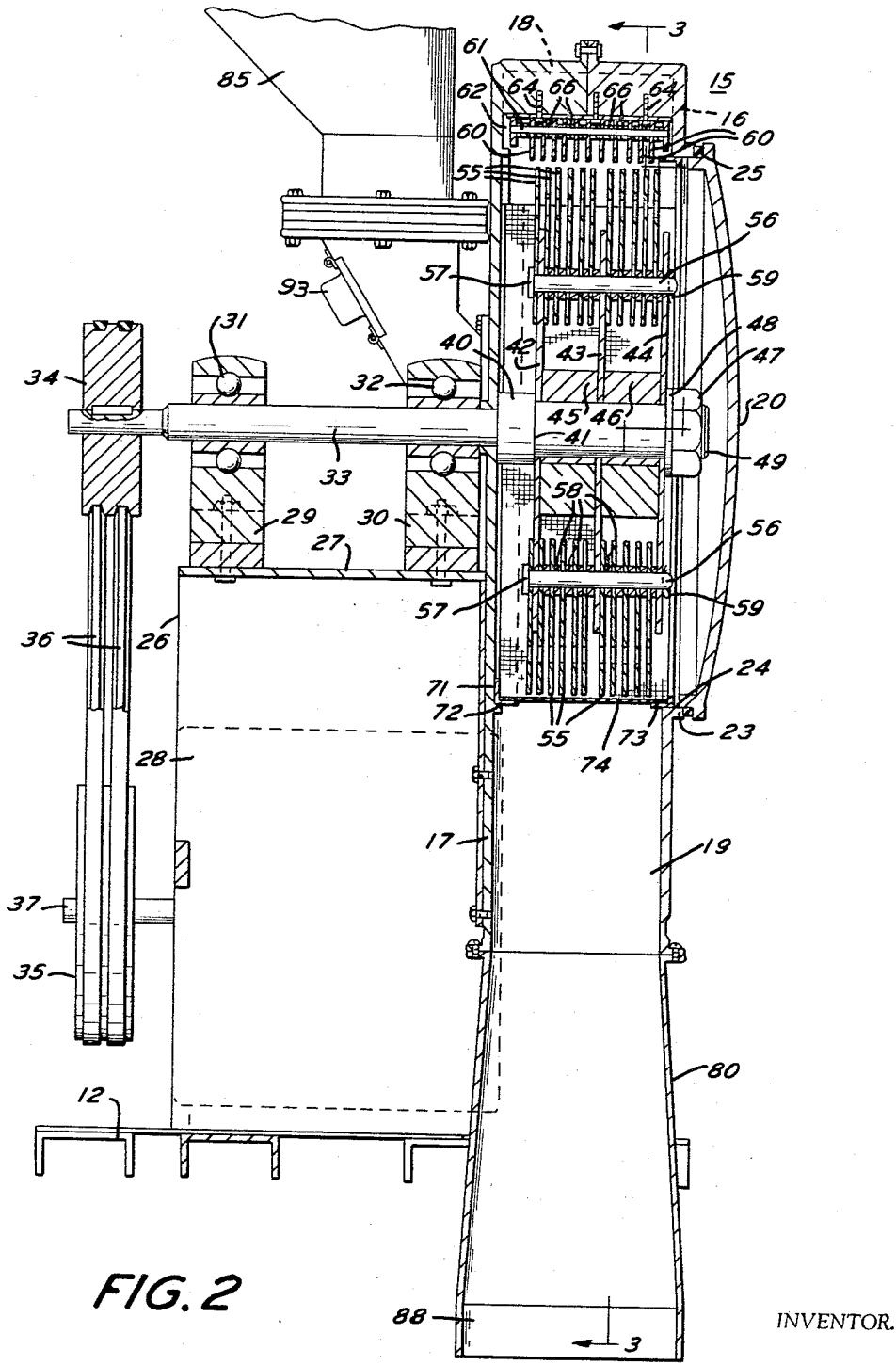
FIG. 2 is a vertical sectional view, enlarged, taken approximately on the line 22 of FIG. 1.

Within the interior of the housing 15 a screen 70 is provided having an inner interrupted mounting flange 71 which is adapted to seat in the interior of the housing wall 17 on a ledge 72. The screen 70 also has an outer continuous flange 73 facing the interior of the door 20 and engaging the rim 24. A screen plate 74 secured to the flanges 71 and 73 extends around the interior of the housing 15 with a cutout portion 75 (see FIGS. 2, 3 and 6) to accommodate the fixed cutter blades 60.

It will be noted that there is a space 76 between the screen plate 74 and the interior of the housing 15 for the downward movement of the ground material passing through the openings in the screen plate 74.

The screen plate 74 can be of any preferred construction to provide the desired particle size openings, can be of woven wire, but is advantageously of sheet material with openings punched therein. The screen 70 is removable through the door 20 and a screen 70 having the same or a different size of perforations or openings can be employed, the size of the perforations determining the size of the delivered ground particles.

The bottom tubular section 19 has extending downwardly therefrom a lower housing extension 80 with a downwardly and inwardly inclined baffle plate 81 with a pipe connection 82 extending outwardly at one side thereof to permit the entrance of air as hereinafter explained.

The pipe connection 82 may have a bag or cover 83 thereon to reduce the undesired discharge of fine particles of material and to permit the entry of air while preventing the entrance of dirt or undesired contaminants.

A hopper 85 is provided for grain to be ground, elevated above the shaft 33, with a throat section 86 having a slidable control plate 87 for determining the rate of delivery of grain from the hopper 85 into the throat section 86. The throat section 86 is in communication with the interior of the housing 15 and interiorly of the screen 70 at a location offset to one side of the shaft 33 for the delivery of grain into the interior of the screen 70 for grinding.

The lower part of the extension 80 has discharge opening 88 for the delivery of the ground material into a bag 89 or other desired container.

While the structure disclosed is suitable for grinding grain, it is also frequently desired to add to the grain during grinding spreaders such as hay, straw, vegetable, leafy material and the like. An access opening 90 is provided in the wall 17 and communicating with the interior to one side of the shaft 33 and with a slidable cover 91 for closing the same. The opening 90 serves for the introduction of additive materials. The space between the disc 42 and the housing wall 17 permits breaking up the additive materials as they are advanced inwardly through the opening 90 for admixture with the grain being ground.

The throat 86 below the plate 87 can have a door 93 with a magnet 94 carried thereby for removing iron, steel or the like prior to the delivery of the grain for grinding. The door 93 can have a hinge 95 to permit opening and a lock pin 96 for retaining the door in closed position.

The mode of operation will now be pointed out.

Grain from the hopper 85 is delivered downwardly through the throat 86 at a rate determined by the setting of the control plate 87 and is discharged into the space within the interior of the screen 70. The rotation of the shaft 33 causes the blades 55 carried by the discs 42, 43 and 44 to move in circular paths, the centrifugal action carrying the grain outwardly beyond the peripheries of the discs 42, 43 and 44. The agitated movement of the grain with the movement of the blades 55 causes the grain to be thrown against the serrated edges of the blades 60, between the blades 55 and the blades 60, and against the screen 70. The grain is reduced in size in a continuously agitated state and portions of reduced particle size which can pass outwardly through the screen plate 74 and move into the space 76 and downwardly for discharge through the housing extension 80 and the discharge opening 88 into the collecting receptacle or bag 89.

As the grain is being agitated and ground, air enters through the pipe connection 82, passes around the lower end of the baffle plate 81 and in counter flow relation to the ground grain falling downwardly on the outside of the screen plate 74. The air introduced in this manner provides for maintaining the operation at a lower temperature level such that the grain in ground or unground state does not adhere to the screen 70, to the interior of the housing 15 to the discs 42, 43 and 44, the rotating blades 55 or the fixed blades 60.

If it is desired to augment or introduce additives with the grain these may be introduced to the hopper in powdered form, or if in the form of stalks or leafs, may be introduced through the access opening 90 where they are broken up into small fragments and distributed through and with the grain during its grinding. Further diminution in size of the leafy or stalk material will of course be effected by the action of the movable blades 55 with respect to the fixed blades 60.

There has thus been provided a grinder which is effective in its action, has relatively small power requirements, can be used for grinding grain for home use, or for farm use for feed for poultry and farm animals, and which is sturdy and reliable in its action.

I claim:
1. A grinder for grain and the like comprising
   a housing having a discharge portion,
   a supply hopper connected to said housing,
   a rotatable member in said housing having a plurality of spaced blades pivotally mounted thereon,
   said rotatable blades each having a rounded free end,
   said housing having a plurality of circumferentially spaced rows of transversely spaced fixedly mounted blades therein,
   said fixedly mounted blades comprising plates with serrated edges facing toward said rotatable member,
   a screen in circumferential surrounding relation to said rotatable member and having a cylindrical foraminous screen portion with a cut-out,
   said rows of fixed blades being located at the cut-out,
   said housing having an air inlet connection,
   said screen portion being spaced from said housing for delivery of ground material to said discharge portion and for circulation of air from said air inlet connection.

2. A grinder for grain and the like comprising
   a housing with a substantially cylindrical wall and relatively flat opposed walls,
   one of said opposed walls having an access door opening,
   said housing having a downwardly extending discharge extension,
   a rotatable member in said housing,
   a shaft on which said rotatable member is mounted extending through one of said opposed walls,
   said rotatable member having a plurality of spaced discs removably mounted on said shaft,
   mounting rods carried by said discs inwardly of the peripheries thereof and spaced blades pivotally mounted on said rods,
   said blades each having a curved free end portion,
   said cylindrical wall having a plurality of circumferentially spaced rows of transversely spaced fixedly mounted serrated edge blades therein, and with respect to which said pivotally mounted blades are movable,
   a screen member removably mounted in said housing and extending between said opposed walls and having a foraminous wall spaced from said cylindrical wall and providing a space communicating with said discharge connection,
   said foraminous wall having a cut-out portion to accommodate the rows of blades at said fixed location,
   and a supply hopper connected to one of said opposed walls offset with respect to said shaft and radially inwardly of said foraminous wall.

3. A grinder for grain and the like comprising a housing with a substantially cylindrical wall and relatively flat opposed walls, one of said opposed walls having an access door opening, said housing having a downwardly extending discharge extension, a rotatable member in said housing, a shaft on which said rotatable member is mounted extending through one of said opposed walls, said rotatable member having a plurality of spaced discs removably mounted on said shaft, mounting rods carried by said discs inwardly of the peripheries thereof and spaced blades pivotally mounted on said rods, said cylindrical wall having a plurality of spaced blades at a fixed location thereon and with respect to which said pivotally mounted blades are movable, a screen member removably mounted in said housing and extending between said opposed walls and having a foraminous wall spaced from said cylindrical wall and providing a space communicating with said discharge connection, said foraminous wall having a cut-out portion to accommodate the blades at said fixed location, and a supply hopper connected to one of said opposed walls offset with respect to said shaft and radially inwardly of said foraminous wall, said screen member being carried on a ledge on one of said opposed walls and a rim on the other of said opposed walls and being insertable and removable through said door opening.

4. A grinder for grain and the like comprising a housing with a substantially cylindrical wall and relatively flat opposed walls, one of said opposed walls having an access door opening, said housing having a downwardly extending discharge extension, a rotatable member in said housing, a shaft on which said rotatable member is mounted extending through one of said opposed walls, said rotatable member having a plurality of spaced discs removably mounted on said shaft, mounting rods carried by said discs inwardly of the peripheries thereof and spaced blades pivotally mounted on said rods, said cylinder wall having a plurality of spaced blades at a fixed location thereon and with respect to which said pivotally mounted blades are movable, a screen member removably mounted in said housing and extending between said opposed walls and having a foraminous wall spaced from said cylindrical wall and providing a space communicating with said discharge connection, said foraminous wall having a cut-out portion to accommodate the blades at said fixed location, and a supply hopper connected to one of said opposed walls offset with respect to said shaft and radially inwardly of said foraminous wall, said discharge extension having an air inlet connection, and a ground material and air guiding baffle being provided in said discharge extension.

References Cited

UNITED STATES PATENTS

| | | | |
|---|---|---|---|
| 963,224 | 7/1910 | Hess | 241—190 X |
| 1,562,562 | 11/1925 | Jacobson | 241—55 |
| 2,026,426 | 12/1935 | Matejcik | 241—51 |
| 2,291,815 | 8/1942 | Korum | 241—186 X |
| 2,856,134 | 10/1958 | Tormey | 241—186 |
| 3,123,312 | 3/1964 | Palyi | 241—55 |

ROBERT C. RIORDON, *Primary Examiner.*

D. KELLY, *Assistant Examiner.*